United States Patent
Chen et al.

(10) Patent No.: US 7,392,247 B2
(45) Date of Patent: Jun. 24, 2008

(54) METHOD AND APPARATUS FOR FUSING CONTEXT DATA

(75) Inventors: Ying Chen, Beijing (CN); Hui Lei, Scarsdale, NY (US); Jussi P. Myllymaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 10/314,059

(22) Filed: Dec. 6, 2002

(65) Prior Publication Data

US 2004/0111397 A1  Jun. 10, 2004

(51) Int. Cl.
*G06F 17/30* (2006.01)
(52) U.S. Cl. .......................................................... 707/5
(58) Field of Classification Search ............... 707/2, 707/5, 6, 10, 104.1; 708/490; 709/201–203; 706/52, 900
See application file for complete search history.

(56) References Cited

U.S. PATENT DOCUMENTS

| | | | | |
|---|---|---|---|---|
| 6,122,628 A | * | 9/2000 | Castelli et al. ................. | 707/5 |
| 6,161,018 A | * | 12/2000 | Reed et al. ................ | 455/456.1 |
| 6,477,380 B1 | * | 11/2002 | Uehara et al. ............. | 455/456.1 |
| 2002/0090957 A1 | * | 7/2002 | Harris ......................... | 455/456 |
| 2003/0130987 A1 | * | 7/2003 | Edlund et al. .................. | 707/3 |
| 2003/0182394 A1 | * | 9/2003 | Ryngler et al. .............. | 709/217 |

OTHER PUBLICATIONS

Myllymaki et al., "Location Aggregation from Multiple Sources", Third International Conference on Mobile Data Management, Jan. 8-11, 2002, pp. 131-138.*

* cited by examiner

*Primary Examiner*—Apu Mofiz
*Assistant Examiner*—Kavita Padmanabhan
(74) *Attorney, Agent, or Firm*—Scully, Scott, Murphy & Presser, P.C.; Anne V. Dougherty, Esq.

(57) ABSTRACT

A context fusing system and methodology includes the steps of receiving context data from a plurality of information sources; computing a quality measure for each input context value; organizing context values into one or more clusters, and assigning a single context value and a single quality measure to each cluster; and, selecting one or more clusters according to one or more criteria and aggregating the context values and quality measures of selected clusters to generate a single context value and single quality measure. The single context value and single quality measure are usable by a context aware application to avoid conflict and ambiguity among different information sources providing the context data.

26 Claims, 2 Drawing Sheets

System Architecture

System Architecture

System Flowchart

METHOD AND APPARATUS FOR FUSING CONTEXT DATA

BACKGROUND OF THE INVENTION

1. Field of the Invention

The present invention relates generally to context-aware applications for computer systems, and more particularly to a novel context fusing system and methodology for supporting context-aware devices and applications.

2. Description of the Prior Art

Pervasive computing applications are increasingly relying on the context of the user whom the application is designed to support. Contextual information is derived from a variety of sources and enables the application to provide the user with qualitatively better service. For instance, context awareness can be seen as key to such pervasive computing features as personalized access, intention inference, resource opportunism, and system proactivity. The net result of improved context awareness is a reduced demand for human attention by the application.

Context awareness is made possible by the ubiquity of sensors of different kinds. For instance, several sources of location information are typically available—consider the rapidly expanding use of cellular phones (some of which are already enabled for location tracking in order to help emergency rescue teams), GPS receivers, wireless LAN computers, wireless PDAs such as the Blackberry device, electronic calendars, and active badges. Despite this abundance of contextual information, one key problem remains: resolution of conflicts and ambiguities among different information sources.

As a motivating example, the following scenario is considered: A user's car is equipped with a GPS tracking device which periodically beacons the car's location to a central server. The user also carries a wireless PDA which beacons its location to the same server. Now, if the car was last reported seen in "San Francisco" 5 minutes ago and the PDA was last reported seen in "San Jose" 10 minutes ago, which location report should the system pick as the most current and accurate? In other words, which context is the user currently in? Surely the user cannot have moved from San Jose to San Francisco in 5 minutes.

In Paul Castro and Richard Muntz, "Managing Context Data for Smart Spaces," IEEE Personal Communications, Vol. 7, No. 5, (October 2000), pp. 44-46, a context fusion service that uses evidential reasoning techniques, is described. However, this service has a number of disadvantages. First, it works with a pre-determined set of context sources only and does not support dynamically added sources. Second, it requires a separate training phase in order to obtain the probability distribution of input context values. Third, both input and output context values must be quantized into discrete values.

Asim Smailagic and David Kogan, "Location Sensing and Privacy in a Context Aware Computing Environment," IEEE Wireless Communications, October 2002, teaches a method for fusing location data in a wireless LAN environment based on a combination of triangulation and mapping. The method also requires a pre-determination of context (location) sources and a separate training phase. In addition, it handles homogeneous location data only.

Another method for fusing location data is described in Jussi Myllymaki and Stefan Edlund, "Location Aggregation from Multiple Sources," Proceedings of International Conference on Mobile Data Management, Singapore, 2002. The method ranks location reports from different sources and selects the most probable one based on factors such as time, user associativity and device mobility. Besides being location-specific, this method does not consider the relationships between input values and is not able to improve the precision of input values.

Therefore, a need exists for a general fusion technique that can accurately fuse context data from a dynamic set of sources.

It would be highly desirable to provide a context fusion system and software architecture for supporting pervasive computing devices.

SUMMARY OF THE INVENTION

The present invention is directed to a very general framework for context fusion that addresses the problem of resolving conflicting contextual information and removing ambiguities to provide applications and other systems with dependable, aggregated, and vastly improved context information. It reduces the likelihood of errors made by a context-aware application and thereby helps improve user efficiency and satisfaction with the system.

According to the principles of the invention, there is provided a system and method for fusing context data for use by context aware applications. The method includes the steps of receiving context data from a plurality of information sources; computing a quality measure for each input context value; organizing context values into one or more clusters, and assigning a single context value and a single quality measure to each cluster; and, selecting one or more clusters according to one or more criteria and aggregating the context values and quality measures of selected clusters to generate a single context value and single quality measure. The single context value and single quality measure are usable by a context aware application to avoid conflict and ambiguity among different information sources providing the context data.

Advantageously, the system and method for fusing context data according to the invention accommodates the dynamic availability of context sources and is widely applicable for use in a variety of context aware applications. Furthermore, no prior training is required to practice the invention.

BRIEF DESCRIPTION OF THE FIGURES

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
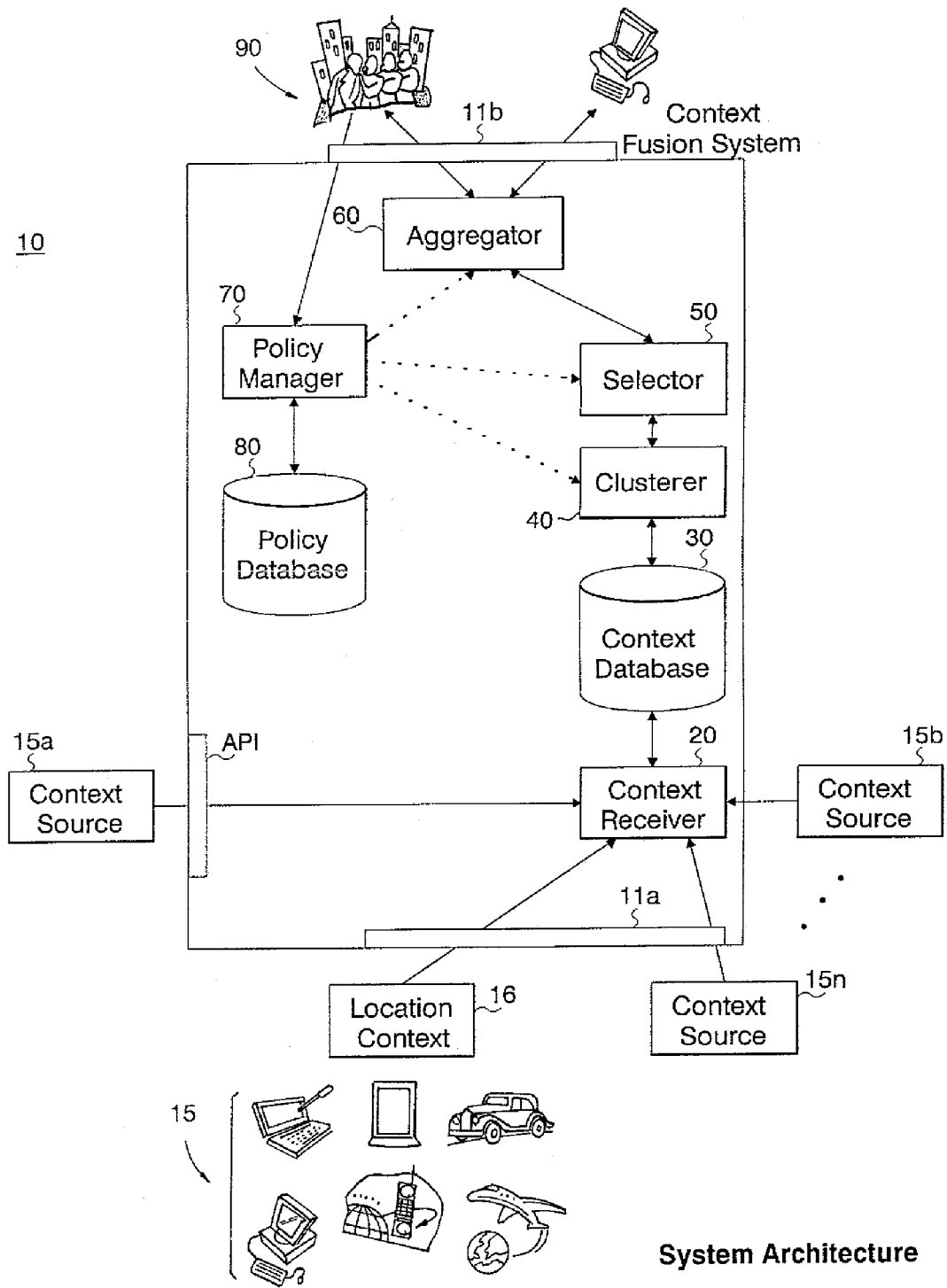
FIG. 1 illustrates the Context Fusion System 10 according to the invention; and, FIG. 2 illustrates a flowchart depicting the methodology employed in the system of FIG. 1.

The Context Fusion System 10 that receives data from one or more context sources 15 filters and aggregates the data, and forwards it to an application or user is now described with respect to FIG. 1. In one embodiment, the Context Fusion System 10 follows a "push model" where context sources 15a, 15b, . . . , 15n submit context data to the system without an explicit request by the system. In contrast, an alternate embodiment would be a system implementing a "pull model" where context sources 15a, 15b, . . . , 15n are explicitly queried, on demand from the application or user, for context data. An embodiment consisting of a mixture of push and pull sources is also possible and can be realized by anyone skilled in the art.

It is understood that context sources $15a, 15b, \ldots, 15n$ may differ greatly in terms of their capacity to process and refine context data before submitting it to the Context Fusion System 10. No assumptions are made as to their degree of sophistication and it is only required that the source indicate its quality assessment (belief) on the data it reports. For example, a location context source 16 may simply retrieve the current location of a mobile phone user from a wireless operator's network and forward the data unaltered to the Context Fusion System 10. Another location context source may record historical location data and apply sophisticated trajectory analysis, pattern discovery, and location prediction algorithms on the raw data and submit only refined data to the Context Fusion System 10.

The input to the Context Fusion System (CFS) 10 comprises a vector of context values $V1, V2, \ldots, Vn$ on a single subject form various sources. Each value represents a context source's belief on the state of the subject. Let each context value be represented by a tuple $Vi=(CVi, Bi)$ where $CVi$ contains the state of the subject and $Bi$ represents the source's assessment (belief) of the quality of $CVi$. For instance, in a simple case, $Bi$ may represent the probability between 0 and 1 that $CVi$ is true. In the general case $CVi$ can be a scalar value, a vector value, a geometric shape, or any other type of data value. Thus, the context fusion system 10 and method has a wide range of applicability as it is able to process context data comprising point values, shape values, discrete values, continuous values, and finite and infinite data ranges.

In the preferred embodiment, the output of the CFS is a single context value $Vout=(CV, Q)$ where CV represents the best knowledge on the state of the subject and Q is a quality measure on CV.

As further shown in FIG. 1, the Context Fusion System (CFS) 10 comprises seven components: a Context Receiver 20, a context Database 30, a Clusterer 40, a Selector 50, an Aggregator 60, a Policy Manager 70, and a Policy Database 80. The CFS 10 interfaces with the external world via one or more Context Sources $15a, \ldots, 15n$ and Context-Aware Applications 90, also shown in FIG. 1.

The Context Receiver component 20 particularly functions to receive context values of the form $Vi=(CVi, Bi)$ from one or more Context Sources $15a, \ldots, 15n$. The Receiver 20 performs any necessary data format conversion on $CVi$, for instance scaling, normalization, and duplicate removal, as deemed necessary for each particular Context Source.

Based on $Bi$ and other external factors, the Receiver component 20 computes a value $Qi$ that represents a quality measure on $CVi$. Among other things, these external factors may include the following: timestamps associated with $CVi$ (creation, last modification, and expiration time) and the perceived confidence of the Receiver in the Context Source, either specified or derived from historical data.

It should be understood that Context Sources $15a, \ldots, 15n$ operate independently of the Receiver and may submit new context values to the Receiver at any time. The normalized context value tuples $Vi=(CVi, Qi)$ are stored in the Context Database 30. Preferably, the Context Database 30 stores context values as triplets $R=(U, CVi, Qi)$ where U is a global identifier for the user and R is a record in the database. Any database may be used for the Context Database 30, e.g. relational database, flat file, or main memory data structure.

The Clusterer component 40 functions to perform a first pass through the context values and organize it into one or more clusters. For each cluster, a combined context value CV and quality measure Q are generated. It should be understood that many clustering methods are possible. For example, one clustering method includes making each distinct input value a separate cluster. Another manner for clustering is to make a single cluster out of all input values. According to the invention, several methods may be used to combine context values $CVi$ into a single CV, including, but not limited to: the context value with best quality; the average context value (for continuous range); the average context value weighted by quality (for continuous range); the intersection of context values (for shapes); and, the center of gravity (for shapes and points). Several methods additionally exist for combining quality measures $Qi$ into a single Q, including, but not limited to: the maximum $Qi$ value (optimistic quality assessment); the minimum $Qi$ value (pessimistic quality assessment); the $Qi$ of the $Cvi$ chosen to represent the cluster; and, the average $Qi$.

The generated clusters and their associated values CV and quality measures Q are forwarded to the Selector component 50 which functions to determine a subset of the clusters for further aggregation to be implemented. The selection may be performed according to a variety of criteria, including, but not limited to: cluster size (number of context values in the cluster); cluster quality (Q value); and, cluster tightness (how closely the context values fit into the cluster, i.e., how much wasted space the cluster has). A simple measure of tightness is the size of the minimum bounding box of all context values in the cluster. Another simple measure is the sum of the areas of all context values divided by the minimum bounding box of all context values in the cluster.

The selected clusters are forwarded to the Aggregator component 60 which functions to combine the selected clusters into a single context value CV and quality measure Q. As described in the context of the Clusterer component 40, several methods exist for combining context values and quality measures.

As shown in FIG. 1, the Policy Manager component 70 guides each of the Clusterer 40, Selector 50, and Aggregator 60 components in their decision-making. A policy may, for instance, dictate what specific clustering algorithm the CFS should use. The policy chosen may depend on the user, application, and type of context (e.g., location vs. calendar context). The policies chosen for the Clusterer 40, Selector 50, and Aggregator 60 components are stored in the Policy Database 80. Particularly, data is stored in the database as tuples $R=(U, A, CT, CP, SP, AP)$ where U corresponds to the user, A is the application, CT is the context type, and CP, SP, and AP correspond to the Clusterer policy, Selector policy, and Aggregator policy, respectively. The CFS 10 may provide a default set of policies, which may be supplemented or replaced by user-supplied policies. Default or user-supplied policies may be selected by the user or automatically selected by the system 10.

As shown in FIG. 1, the output of the Aggregator component 60 which comprises context data in the form of a single context value CV and a quality measure Q, for example, is input to an Application 90. The Application 90 particularly, is any context aware application that receives context data from CFS 10. The Application may make an explicit request to CFS to get fresh context data (i.e., a pull model) or may receive context data updates from CFS as new data becomes available (i.e., a push model).

The CFS system 10 and system components thereof may be implemented in a server device, e.g., a web-server, or, may be distributed among a plurality of interconnected server, computer and database devices. An application program interface (API) $11a$, $11b$ may be provided as part of the system to facilitate the communication of the context source data between the client (context source) and the Context Receiver 20, and/or between the system 10 and the user or application 90, depending upon whether a push-model or pull-model is implemented.

Figure 2:
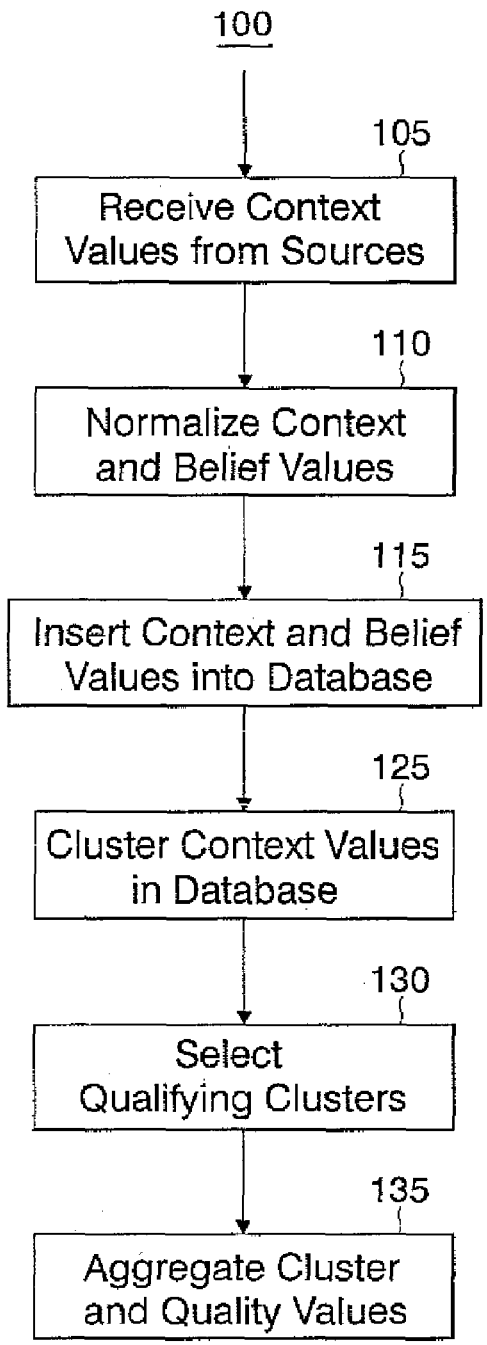

The process 100 implemented by the context fusion system of the invention is now depicted in FIG. 2. As shown in FIG. 2, a continuous process is depicted that includes a first step 105 of receiving the context values from sources, as requested by a user or user application via a pull-model or, as "pushed" to the system from a variety of widely available context data sources. At step 110, an optional step of normalizing the content and the quality assessment (belief) values indicated by the source as to the data it reports is provided. Then, at step 115, the context values and quality assessment (belief) values are inserted into a database where the context values are organized as clusters at step 125 in the manner as described. Then, step 130 includes selecting the qualifying clusters for aggregation which is followed by the aggregating step performed at step 135. It is understood that after aggregating the resulting single context value and single quality measure value is made available to the user or user application.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

The invention claimed is:

1. A method for fusing context data comprising the steps of:
    (a) receiving context data including one or more context values from a plurality of information sources;
    (b) computing a quality measure for each context value;
    (c) organizing context values into one or more clusters, at least one of the clusters having a plurality of context values, and assigning a single context value and a single quality measure to each of said clusters;
    (d) selecting one or more clusters from said clusters according to one or more criteria; and
    (e) aggregating the assigned single context values and quality measures of said selected one or more clusters to generate a single representative context value and single representative quality measure,
    wherein said single representative context value and single representative quality measure are usable by a context aware application to avoid conflict and ambiguity among different information sources providing said context data,
    further comprising the steps of guiding clustering, selecting and aggregating operations used in generating said single representative context value, said guiding performed according to a respective clustering policy, selection policy, and aggregation policy,
    wherein a selection policy implements a step of selecting according to sum of areas of all context values divided by minimum bounding box of all context values in the cluster.

2. The method of claim 1, wherein prior to said computing step b), the further step of receiving attributes of the context data from sources, said sources including a sensor device.

3. The method of claim 2, wherein said step b) of computing a quality measure for each input context value includes one or more of: accounting for attributes associated with the context data, or attributes associated with a sensor device or source providing said context data.

4. The method of claim 3, wherein said attributes associated with context data include a timestamp associated with context value, said timestamp indicating one or more of: when a context value data is sensed or created, when a context value is last modified, or when said context value expires; and said attributes associated with context data further including a sensor-asserted confidence in the context data.

5. The method of claim 3, wherein attributes associated with a sensor device include a user-perceived confidence in the sensor device or source providing the context data.

6. The method of claim 1, further including the step of maintaining default clustering, selection and aggregation policies, said clustering, selecting and aggregating operations being automatically selected.

7. The method of claim 1, further including the step of enabling a user to specify said clustering, selection and aggregation policies used for guiding said clustering, selecting and aggregating operations.

8. The method of claim 1, wherein a clustering policy implements steps of:
    assigning context values into groups; and for each group, combining context values of that group into said single representative context value, and combining quality measures of that group into said single representative quality measure.

9. The method of claim 8, wherein a clustering policy step of combining context values of a cluster into said single representative context value includes determining a context value having best quality measure.

10. The method of claim 8, wherein said context values represent shape values, the step of combining context values of a cluster into said single representative context value includes determining an intersection of said shape values.

11. The method of claim 8, wherein said context values represent shape values, said step of combining context values of a cluster into said single representative context value includes step of computing the center of gravity of said shape values.

12. The method of claim 8, wherein the step of combining quality measures of a cluster into said single representative quality measure includes determining a maximum quality measure value.

13. The method of claim 8, wherein a clustering policy step of combining context values of a cluster into said single representative context value includes computing an average context value.

14. The method of claim 8, wherein a clustering policy step of combining context values of a cluster into said single representative context value includes computing an average context value wherein the average context value is weighted by a quality measure.

15. The method of claim 8, wherein said context values represent point values, said step of combining context values of a cluster into said single representative context value includes step of computing the center of gravity of said point values.

16. The method of claim 8, wherein the step of combining quality measures of a cluster into said single representative quality measure includes determining a minimum quality measure value.

17. The method of claim 8, wherein the step of combining quality measures of a cluster into said single representative quality measure includes determining a quality measure associated with a context value representative of the cluster.

18. The method of claim 8, wherein the step of combining quality measures of a cluster into said single representative quality measure includes computing an average quality measure value.

19. The method of claim 1, wherein a selection policy implements a step of selecting according to.

20. The method of claim 1, wherein a selection policy implements a step of selecting according to one or more of: the desired number of selections; and a minimum threshold quality measure.

21. The method of claim 1, wherein said context values are point values, an aggregation policy for guiding aggregating of context values and quality measures of selected clusters to generate said single representative context value and said single representative quality measure including the step computing an average context value.

22. The method of claim 21, wherein said computed average context value is weighted according to a quality measure.

23. The method of claim 1, wherein said context values includes a belief value representing a context source's belief of the quality of a state of a single subject represented in a context value.

24. The method of claim 1, wherein a selection policy implements a step of selecting according to cluster quality.

25. The method of claim 1, wherein a selection policy implements a step of selecting according to size of bounding box of all context values in the cluster.

26. The method of claim 1, wherein an aggregation policy for guiding aggregating of context values and quality measures of selected clusters to generate said single representative context value and said single representative quality measure includes determining a context value with best quality.

* * * * *